(12) United States Patent
Koshimae et al.

(10) Patent No.: US 7,817,690 B2
(45) Date of Patent: Oct. 19, 2010

(54) LASER GENERATOR AND METHOD OF CONTROLLING THE SAME

(75) Inventors: Toshiki Koshimae, Chiyoda-ku (JP); Takeshi Morimoto, Chiyoda-ku (JP); Toshiaki Watanabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 88 days.

(21) Appl. No.: 12/095,455

(22) PCT Filed: Feb. 2, 2006

(86) PCT No.: PCT/JP2006/301719

§ 371 (c)(1),
(2), (4) Date: Oct. 31, 2008

(87) PCT Pub. No.: WO2007/094028

PCT Pub. Date: Aug. 23, 2007

(65) Prior Publication Data
US 2009/0185587 A1      Jul. 23, 2009

(51) Int. Cl.
*H01S 3/00* (2006.01)
(52) U.S. Cl. .................. 372/38.09; 372/21; 372/22; 372/29.015; 372/38.01
(58) Field of Classification Search .......... 372/21, 372/29.015, 38.01, 38.09, 22
See application file for complete search history.

(56) References Cited

U.S. PATENT DOCUMENTS 7,242,700 B2 * 7/2007 Wang ................. 372/22

2005/0163174 A1 * 7/2005 Nakayama et al. ........ 372/22

FOREIGN PATENT DOCUMENTS

| JP | 63-133686 A | 6/1988 |
| JP | 4-249386 A | 9/1992 |
| JP | 8-8480 A | 1/1996 |
| JP | 10-70333 A | 3/1998 |
| JP | 2005-209965 A | 8/2005 |

\* cited by examiner

*Primary Examiner*—Tod T Van Roy
(74) *Attorney, Agent, or Firm*—Sughrue Mion, PLLC

(57) ABSTRACT

A laser generator includes a generation means for pumping by a pumping light source (7) a pumping medium (3) to generate a fundamental-wave laser beam, an output sensor (6) for measuring average output power or pulse energy of the fundamental-wave laser beam, a wavelength-conversion element (5), arranged on an optical path for the fundamental-wave laser beam, for converting the fundamental-wave laser beam into its higher-harmonic-wave laser beam, and a controller (9) for memorizing a determination value set to a value lower than a breakage threshold for average output power or pulse energy of the laser beam converted by the wavelength-conversion element (5), and for, when the measurement value becomes not lower than the determination value, controlling the output power of the fundamental-wave laser beam to be a value lower than the breakage threshold; thereby, the beam intensity through the wavelength-conversion element (5) never exceeds the breakage threshold, and thus breakage of the wavelength-conversion element (5) can be prevented.

3 Claims, 9 Drawing Sheets

LASER GENERATOR AND METHOD OF CONTROLLING THE SAME

This Application is a 371 of PCT/JP2006/301719, filed Feb. 2, 2006; the disclosure of which is incorporated herein by reference.

TECHNICAL FIELD

The present invention relates to laser generators and methods of controlling them, in which breakage of a wavelength-conversion element therein can be prevented.

BACKGROUND ART

In a laser generator provided with a wavelength-conversion element, regarding the wavelength-conversion element, generally, the higher the beam intensity of the fundamental wave through the wavelength-conversion element, the more efficiently the wavelength conversion is performed. Accordingly, using a Q-switch, etc., a fundamental wave is converted to a pulsed one having high peak-output power, and thereby the beam intensity is instantaneously increased; thus, the wavelength conversion is efficiently performed. However, because the wavelength-conversion element has its breakage threshold for the beam intensity, if a laser beam whose intensity exceeds the breakage threshold is incident onto the element, a problem may occur that a crystal thereof is broken by the beam; therefore, in order to prevent the breakage of the expensive wavelength-conversion element, in a conventional laser apparatus, electric power to be supplied into a pumping light source, and pumping current and voltage have been limited (for example, refer to Patent Document 1).

Here, the breakage threshold is a value at which, if the beam intensity exceeds the value even by a little, the wavelength-conversion element is broken, which corresponds to the maximum absolute rating. Because the breakage threshold is determined by the structure of the crystal constituting the wavelength-conversion element and its coating, the value can be uniquely obtained in accordance with the wavelength-conversion element.

[Patent Document 1] Japanese Laid-Open Publication No. 2005-209965

DISCLOSURE OF THE INVENTION

[Problems to be Solved by the Invention]

In the conventional laser apparatus, the electric power supplied into the pumping light source, the pumping current, and the voltage have been limited as described above. However, in a case in which characteristics of the pumping light source fluctuate, for example, in a case in which the light source is configured by a laser diode, and the oscillation wavelength of the laser diode varies, even if the same electric power is inputted into the light source, conversion-efficiency fluctuation occurs in a pumping medium such as YAG; thus, difference occurs in the output power of the fundamental-wave laser beam outputted.

For example, in a case in which a pumping light source having relatively poor characteristics is changed to that having relatively fair characteristics, because the fundamental-wave output power becomes higher even at the same inputted electric power, if the inputted electric power does not reach the limit value, the fundamental-wave output power may exceed the breakage threshold of the wavelength-conversion element; consequently, the wavelength-conversion element may be broken. Inversely, in a case in which the pumping light source having relatively fair characteristics is changed to that having relatively poor characteristics, because the limit value of the inputted electric power is relatively low, a required laser-beam intensity cannot be obtained; consequently, processing may not be performed.

Therefore, considering the variation of the pumping-light-source characteristics, every time when the pumping light source is changed, a relationship between the inputted electric power and the fundamental-wave output power need have been obtained, and the limit value need have been set; resultantly, problems have been occurred that an extremely complicated operation is needed.

An objective of the present invention, which is made to solve the above problems, is to provide a laser generator in which breakage of a wavelength-conversion element can be suitably prevented even if characteristics of a pumping light source fluctuate.

[Means for Solving the Problem]

A laser generator according to the present invention includes a generation means for pumping by a pumping light source a pumping medium to generate a fundamental-wave laser beam; an output sensor for measuring average output power or pulse energy of the fundamental-wave laser beam; a wavelength-conversion element, arranged on an optical path for the fundamental-wave laser beam, for converting the fundamental-wave laser beam into its higher-harmonic-wave laser beam; and a controller for, by comparing a determination value set to a value lower than a breakage threshold for average output power or pulse energy of the laser beam converted by the wavelength-conversion element with a measurement value measured by the output sensor, when the measurement value becomes not lower than the determination value, controlling the output power of the fundamental-wave laser beam to be a value lower than the breakage threshold.

[Advantageous Effect of the Invention]

As described above, according to the present invention, the means has been configured so as to be provided, in which the average output power or the pulse energy of the fundamental-wave laser beam is measured, then this measurement value is compared with the determination value set to lower than the breakage threshold of the wavelength-conversion element, and thereby, when the measurement value is higher than the determination value, the output power of the fundamental-wave laser beam is set lower than the breakage threshold; therefore, the beam intensity through the wavelength-conversion element does not exceed the breakage threshold, and thus breakage of the wavelength-conversion element can be prevented.

BEST MODE FOR CARRYING OUT THE INVENTION

Embodiment 1

Figure 1:
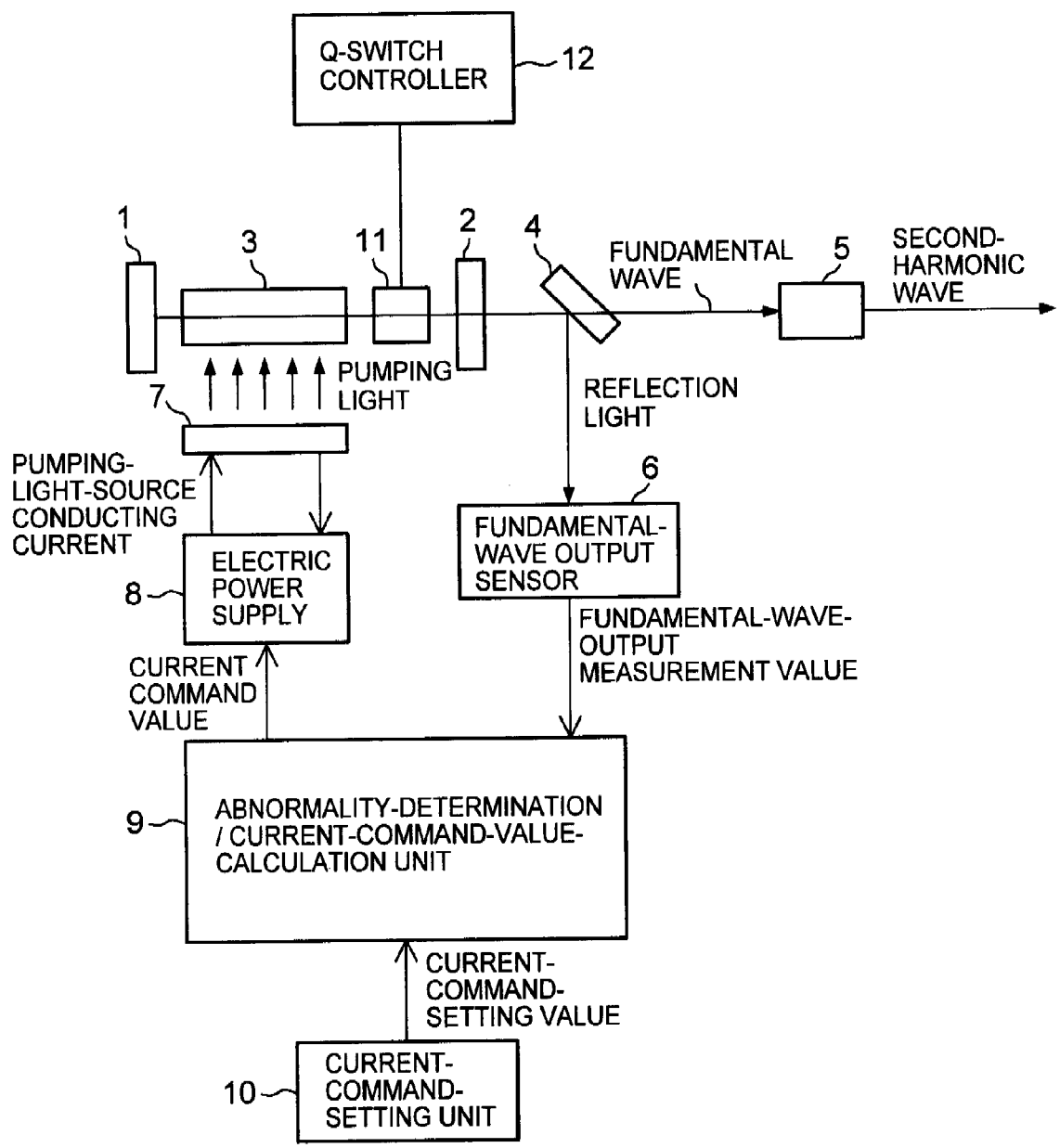
FIG. 1 is an overall schematic diagram of a laser generator representing Embodiment 1 according to the present invention.

FIG. 1 is an overall schematic diagram representing Embodiment 1 of a laser generator according to the present invention. Hereinafter, the configuration of this embodiment is explained based on FIG. 1.

A fundamental-wave laser beam is generated by a resonator including a total-reflection mirror 1, a partial reflection mirror 2, a pumping medium 3, a pumping light source 7, and a Q-switch 11. The pumping medium 3 including Nd:YAG, etc., and the Q-switch 11 configured by an acoustic-optic element (A/O element) are placed between the total-reflection mirror 1 and the partial reflection mirror 2; thus, the Q-switch 11 is on-off controlled by a signal outputted from a Q-switch controller 12. Due to current supplied from an electric power supply 8, the pumping light source 7 configured by a lamp or a laser diode generates pumping light; then, the pumping medium 3 is pumped by the pumping light. Simultaneously, due to an on-off operation of the Q-switch 11, resonance occurs between the total-reflection mirror 1 and the partial reflection mirror 2; consequently, the fundamental-wave laser beam having high-peak power is generated therefrom. The high-peak-power fundamental-wave laser beam is incident onto a wavelength-conversion element 5 composed of a KTP crystal or an LBO crystal; then, its second-harmonic-wave laser beam is generated. For example, in a case in which the pumping medium is Nd:YAG, the wavelength of the fundamental wave is 1,064 nm, and that of the second-harmonic wave is 532 nm. Moreover, a part of the high-peak-power fundamental-wave laser beam is extracted by the partial-reflection mirror 4, and is incident onto a fundamental-wave output sensor 6. The value, measured by the fundamental-wave output sensor 6, of the average output power or the pulse energy of the fundamental-wave laser beam (hereinafter, called as fundamental-wave output or a fundamental-wave output value) is transmitted to an abnormality-determination/current-command-value-calculation unit 9 on an as-needed basis; then, the abnormality-determination/current-command-value-calculation unit 9 reads the measurement value at a predetermined timing, and determines whether the fundamental-wave output is abnormal.

The intensity of the second-harmonic-wave laser beam is controlled by the current supplied to the pumping light source, where the current is controlled as follows. First, a current-command-setting value corresponding to the current needed for obtaining desired laser-beam intensity is set by a current-command-setting unit 10 such as an input unit provided on an operation panel. Regarding the current-command-setting value, an operator may input a value using the input unit as the above, or a value written in a processing program may be read in. The current-command-setting value having been set is continuously outputted from the current-command-setting unit 10, and transmitted to the abnormality-determination/current-command-value-calculation unit 9. The abnormality-determination/current-command-value-calculation unit 9 determines whether the abnormality occurs or not, based on the measured fundamental-wave output value measured by the fundamental-wave output sensor 6; additionally, according to the determination result, continuously outputs to the electric power supply 8 the current command value that corresponds to the current supplied to the pumping light source by the electric power supply 8. Thus, the electric power supply 8 supplies to the pumping light source 7 the current in accordance with the current command value; whereby, the fundamental-wave output power is controlled.

Generally, the current command value and the current-command-setting value are outputted as a voltage; then, the voltage is converted to current by the electric power supply 8. For example, if the equivalency of the voltage/current is 10 V/100 A, when the current needed for the pumping light source 7 is 30 A, the current command value, etc. is 3 V. Moreover, the current command value, etc. may sometimes be outputted by a digitized value. In such a case, the desired current value itself is transmitted to the electric power supply 8 in a predetermined cycle; then, the electric power supply 8 supplies to the pumping light source 7 the current in accordance with the transmitted current value.

Next, abnormality determination in the abnormality-determination/current-command-value-calculation unit 9 is explained.

Figure 2A:
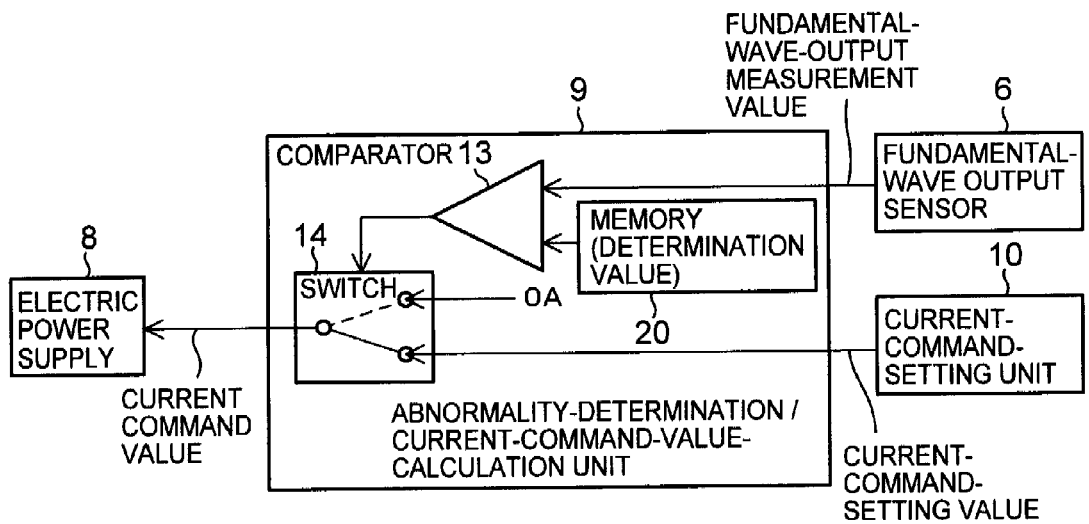
FIG. 2 includes block diagrams each representing a configuration of a controller provided in the laser generator of Embodiment 1 according to the present invention.
Figure 2B:
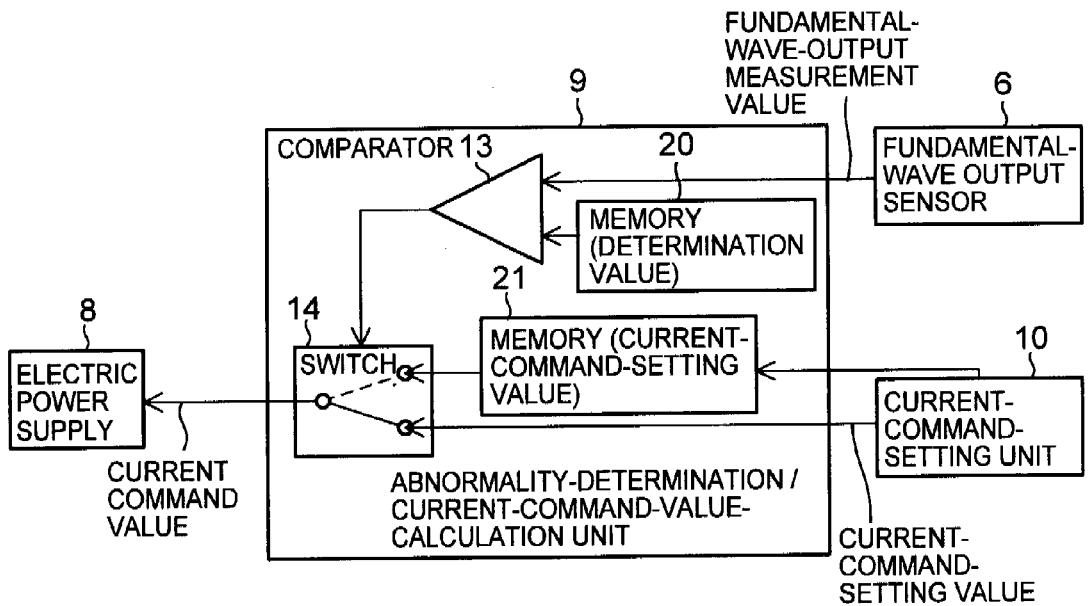
Figure 3:
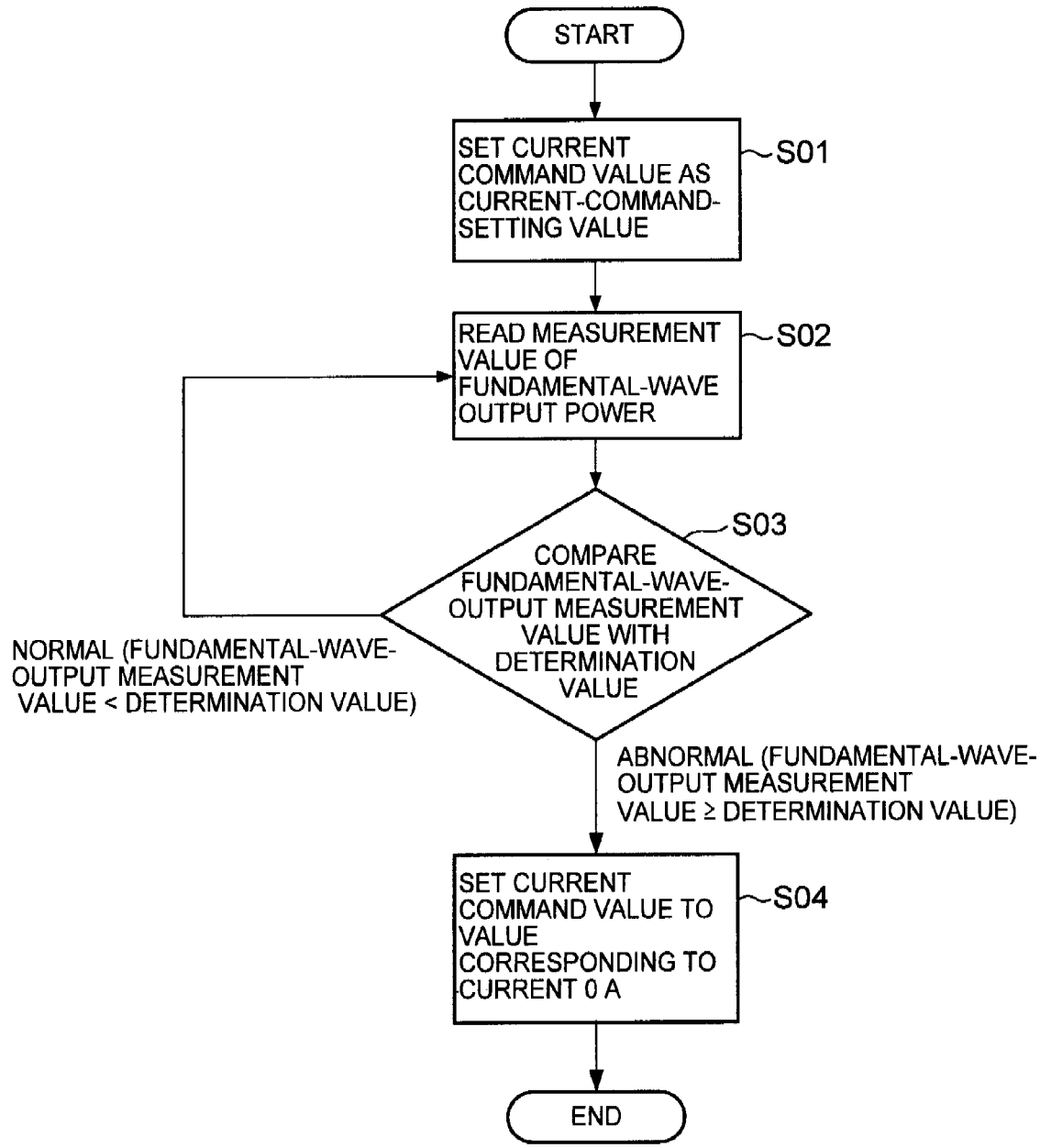
FIG. 3 is a flowchart representing an operation of the controller provided in the laser generator of Embodiment 1 according to the present invention.

FIG. 2(*a*) is a block diagram representing the internal configuration of the abnormality-determination/current-command-value-calculation unit 9, and FIG. 3 is a flowchart explaining an operation of the abnormality-determination/current-command-value-calculation unit 9. Hereinafter, explanation is made based on FIG. 2(*a*) and FIG. 3.

First, a switch 14 provided in the abnormality-determination/current-command-value-calculation unit 9 is set to a state in which the current-command-setting value inputted from the current-command-setting unit 10 is, as a first current command value, transmitted to the electric power supply 8 without modification (which corresponds to a case in which the switch 14 is in the state represented by a solid line in FIG. 2(*a*)) (Step S01).

Next, the abnormality-determination/current-command-value-calculation unit 9 reads a fundamental-wave-output measurement value from the fundamental-wave output sensor 6 (Step S02).

Then, a comparator 13 compares the measurement value with a determination value that has been previously memorized in a memory 20 (Step S03).

As a result of the comparison by the comparator 13, when the measurement value of the fundamental-wave output power is lower than the determination value, the output power is determined to be normal, and the switch 14 is held to the state in which the current-command-setting value inputted from the current-command-setting unit 10 is transmitted, as the first current-command value without modification, to the electric power supply 8; then, the abnormality-determination/current-command-value-calculation unit 9 reads the measurement value of the fundamental-wave output sensor 6

(Step S02). During the fundamental-wave output being normal, Step S02 and Step S03 are repeated.

On the other hand, as a result of the comparison by the comparator 13, when the measurement value of the fundamental-wave output power exceeds the determination value, the output power is determined to be abnormal, and the current command value transmitted to the electric power supply 8 is switched by the switch 14 to a second current command value at which the current falls to 0 A (which corresponds to a case in which the switch 14 is in the state represented by a broken line in FIG. 2(*a*)) (Step S04).

Accordingly, after the second current command value at which the current falls to 0 A has been transmitted to the electric power supply 8, the fundamental-wave generation is stopped. According to such operation, when the fundamental-wave output power is determined to be abnormal, the fundamental-wave generation can be stopped.

Here, the determination value is an average output value or a pulse energy one, set lower than the breakage threshold of the wavelength-conversion element 5, of the fundamental-wave output power; therefore, either of them may be used according to the type of the fundamental-wave output sensor 6. In breakage-threshold values, a value related to the pulse energy and that related to the average output are included; therefore, the determination value must be set lower than both of them. Moreover, the breakage threshold is defined by an energy density per unit area; therefore, when the determination value is set, compensation is needed based on the beam diameter on the wavelength-conversion element 5.

However, the breakage threshold of the wavelength-conversion element is determined by the physical structure of the crystal (such as components of the crystal) included in the wavelength-conversion element; therefore, because the breakage threshold is uniquely defined for each wavelength-conversion element provided by its manufacturer, the determination value may be once obtained to set.

First, the types of the fundamental-wave output sensor are explained.

Regarding means for measuring fundamental-wave output power, a case in which average output power is measured using a thermal sensor provided with a thermopile, and a case in which each output-pulse energy value is measured using a high-speed sensor provided with a photodiode are considered. Generally, the sensor provided with the thermopile, etc. has characteristics that its cost is relatively low, and its response is relatively slow, while the sensor provided with the photodiode, etc. has characteristics that its cost is relatively high, and its response is relatively high; therefore, for example, when processing is performed in which laser beam intensity is little varied, the sensor provided with the thermopile, etc. is suitably used, while, when processing is performed in which laser beam intensity is frequently varied, the sensor provided with the photodiode, etc. is suitably used.

Next, a method of setting the determination value corresponding to the type of the fundamental-wave output sensor 6 is explained.

First, in a case in which the average output power is measured using the thermal sensor provided with the thermopile, etc., the determination value is set as follows.

For example, in a case in which an uncoated LBO crystal is used for the wavelength-conversion element, the breakage threshold, with respect to the pulse energy, of the wavelength-conversion element is 2 J/mm$^2$, while that, with respect to the average output power, is 10 MW/mm$^2$. Moreover, as the processing condition, assuming that the beam size is 0.1 mm in radius, and the on-off frequency (=pulse frequency) of the Q-switch is 5 kHz, the average-output-power threshold can be obtained as follows.

(1) Average output-power threshold converted from breakage threshold for single-pulse energy:

$$\text{Threshold} = \text{(Breakage threshold for pulse energy)} \times$$
$$\text{(Beam area)} \times \text{(Pulse frequency)}$$
$$= 2 \text{ J/mm}^2 \times (0.1 \text{ mm} \times 0.1 \text{ mm} \times \pi) \times 5 \text{ kHz}$$
$$= 314 \text{ W}$$

(2) Average output-power threshold converted from breakage threshold for average output power:

$$\text{Threshld} = \text{(Breakage threshold for average output power)} \times$$
$$\text{(Beam area)}$$
$$= 10 \text{ MW/mm}^2 \times (0.1 \text{ mm} \times 0.1 \text{ mm} \times \pi)$$
$$= 314 \text{ kW}$$

From the above (1) and (2) modes, because the average output-power threshold converted from the breakage threshold for the single-pulse energy is lower than that for the average output power, the determination value may be set lower than 314 W.

Next, when the single-pulse peak energy is measured using the high-speed sensor provided with the photodiode, etc., the determination value is set as follows.

In a case of a condition similar to that described above, the threshold for each output-pulse-energy value can be obtained as follows.

(1) Threshold for each output-pulse-energy value converted from breakage threshold for single-pulse energy:

$$\text{Threshold} = \text{(Breakage threshold for pulse energy)} \times$$
$$\text{(Beam area)}$$
$$= 2 \text{ J/mm}^2 \times (0.1 \text{ mm} \times 0.1 \text{ mm} \times \pi)$$
$$= 62.8 \text{ mJ}$$

(2) Threshold for each output-pulse-energy value converted from breakage threshold for average output power:

$$\text{Threshold} = \text{(Breakage threshold for average output power)} \times$$
$$\text{(Beam area)} / \text{(Pulse frequency)}$$
$$= 10 \text{ MW/mm}^2 \times (0.1 \text{ mm} \times 0.1 \text{ mm} \times \pi) / 5 \text{ kHz}$$
$$= 62.8 \text{ J}$$

From the above (1) and (2) modes, because the threshold for each output-pulse-energy value converted from the breakage threshold for the single-pulse energy is lower than that for the average output power, the determination value may be set lower than 62.8 mJ.

The margin between the threshold for the average output power or each output-pulse-energy value and the determination value is not necessary to be widely secured due to the variation of the wavelength-conversion-element breakage threshold being relatively small; for example, a value that is 80% of the threshold may be set as the determination value.

As described above, the breakage threshold for the average output power or that of each output-pulse-energy value is obtained from the breakage threshold of the wavelength-conversion element, and a value smaller than that value is set as the determination value and memorized in the memory 20 included in the abnormality-determination/current-command-value-calculation unit 9; whereby, the abnormality-determination/current-command-value-calculation unit 9 can operate as illustrated in FIG. 3, in which determination whether the fundamental-wave output is normal or abnormal can be suitably performed before reaching the breakage threshold.

In the above explanation, when the fundamental-wave output power exceeds the determination value, the control is taken so that the fundamental-wave generation is stopped. Regarding the operation, the control is simple, and because a state in which the fundamental-wave output power exceeds the determination value represents a high possibility that any malfunction has occurred in the laser generator, the control is performed, from the viewpoint of preventing the malfunction from spreading, so as to stop the fundamental-wave generation. However, if processing in which the laser generator is used is desired not to be stopped in the way of the processing, from the viewpoint of preventing the breakage of the wavelength-conversion element, when the fundamental-wave output power exceeds the determination value, the output power may be controlled so as to be lower than the breakage threshold.

In order to realize this control, for example, control may be performed so that the output is returned to a state before the current-command-setting value is changed. In this case, as represented in FIG. 3(*b*), a current-command-setting value before that transmitted from the current-command-setting unit 10 is memorized in a memory 21, and, when the fundamental-wave output power exceeds the determination value and the abnormality-determination/current-command-value-calculation unit 9 determines to be abnormal, the switch 14 may be controlled so that, instead of a current-command value at which the current falls to 0 A, the value memorized in the memory 21 is transmitted, as a current command, to the electric power supply 8. Alternatively, a current-command value at which the fundamental-wave output power becomes the same as the determination value may be preset instead of the current-command value at which the current falls to 0 A.

According to this embodiment, by providing the means for, after the fundamental-wave output-power determination value obtained from the breakage threshold of the wavelength-conversion element is memorized and the fundamental-wave output power is measured, determining, using the determination value, whether the output power is normal or abnormal, the fundamental-wave laser beam can be suitably stopped, and breakage of the wavelength-conversion element can be prevented. Especially, the breakage threshold of the wavelength-conversion element can be determined by the intensity of the laser beam incident onto the wavelength-conversion element, that is, the breakage of the wavelength-conversion element is directly caused by the fundamental-wave output power; therefore, by performing abnormality determination using the measurement value of the output power, it can be almost surely prevented that the output power exceeds the breakage threshold, even though the characteristics of the pumping light source fluctuate.

Moreover, in this embodiment, abnormality determination is performed not by limiting a current-value as a conventional method, but by using the fundamental-wave output power; therefore, by feed-back controlling the current while monitoring the second-harmonic-wave output power so as to obtain the desired laser output power, the desired laser intensity can also be obtained even though the characteristics of the pumping light source fluctuate, and thus, processing-defect generation due to lack of the laser power, and processing-stop occurrence, etc. can be prevented.

Furthermore, the determination value can be set without considering the characteristic fluctuation of the pumping light source, and the determination value need not be reset every time when the pumping light source is changed; therefore, the maintenance workability is improved.

Embodiment 2

Figure 4:
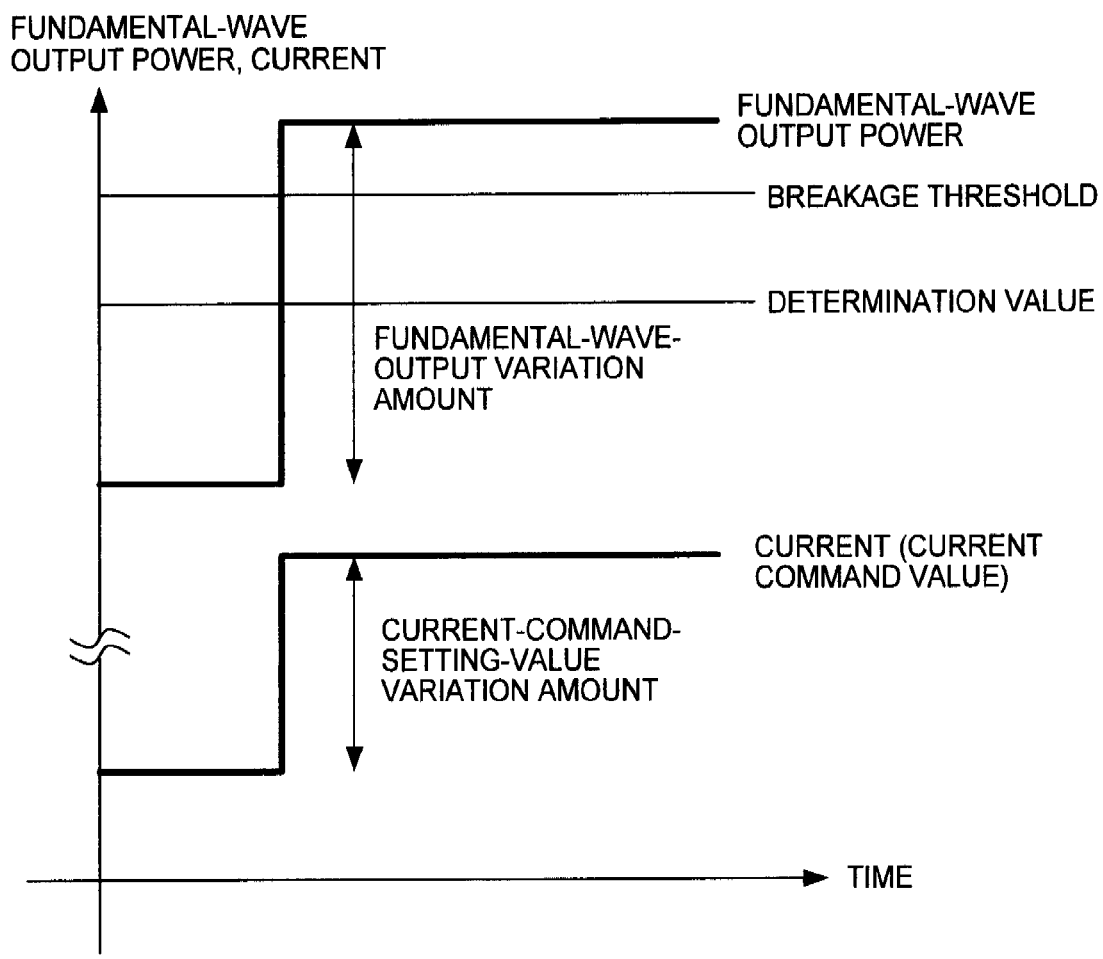
FIG. 4 is a graph representing time dependence of a current command value, and fundamental-wave output power, etc. for a conventional laser generator.

FIG. 4 illustrates time dependence of current supplied to the electric power supply 8 or a current command value corresponding to the current, and the fundamental-wave output power with respect to the current (current command value), in which the property when the current command value varies once, accompanying the current-command-setting value varying once, is represented. In a case of a general laser generator, as represented in FIG. 4, because the fundamental-wave output power followingly varies without delay in response to varying of the current supplied from the electric power supply 8, when the current-command value is drastically varied, the output power also varies drastically without delay; as a result, the output power may far exceed the determination value, and may also simultaneously exceed the breakage threshold of the wavelength-conversion element. In a case of the laser generator according to Embodiment 1, when the fundamental-wave output power exceeds the determination value, due to stopping, by the abnormality-determination/current-command-value-calculation unit 9, of the fundamental-wave laser beam generation, the breakage of the wavelength-conversion element can be simultaneously prevented. However, after the fundamental-wave output power has exceeded the determination value, when the current command value is set to a value at which the current falls to 0 A, in a case in which some time has been spent for determining by the abnormality-determination/current-command-value-calculation unit 9 and for switching by the switch 14, the fundamental-wave output power may exceed the breakage threshold; consequently, the wavelength-conversion element may be broken.

In Embodiment 2, considering this point, the method of setting the current command value by the abnormality-determination/current-command-value-calculation unit 9 according to Embodiment 1 is changed. That is, the current command value has been varied at one time to the current-command-setting value in Embodiment 1; however, in this embodiment, by increasing the current command value stepwise by a predetermined current variation amount at predetermined time intervals, the fundamental-wave output power is increased stepwise. The determination whether the fundamental-wave output power is normal or abnormal is performed by processing similar to that in Embodiment 1. The overall schematic diagram of the laser generator according to this embodiment is similar to that represented in FIG. 1; therefore, explanation is performed suitably using the numerals in FIG. 1.

First, abnormality determination and setting of the current command value in the abnormality-determination/current-command-value-calculation unit 9 is explained.

Figure 5:
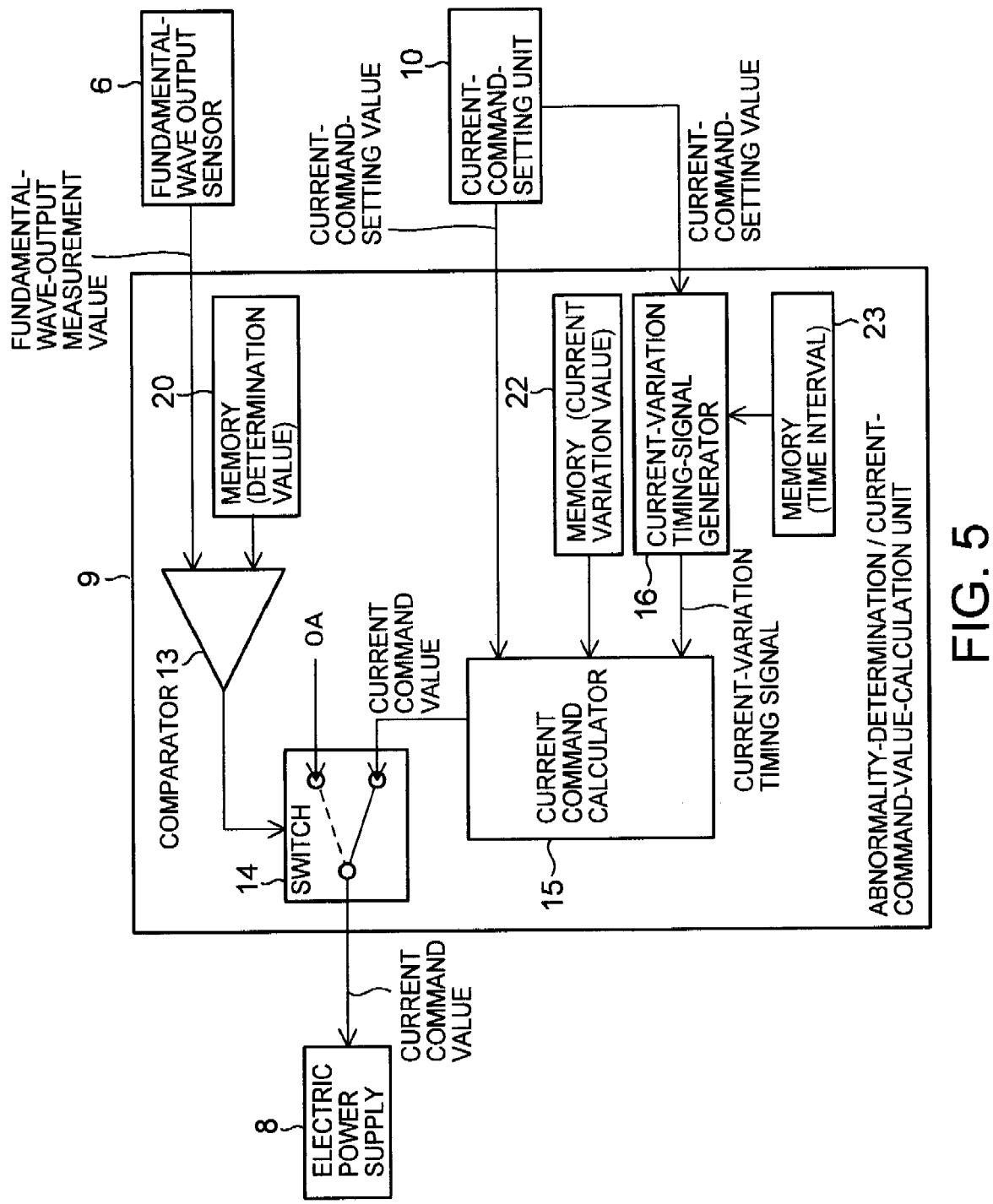
FIG. 5 is a block diagram representing a configuration of a controller provided in a laser generator of Embodiment 2 according to the present invention.
Figure 6:
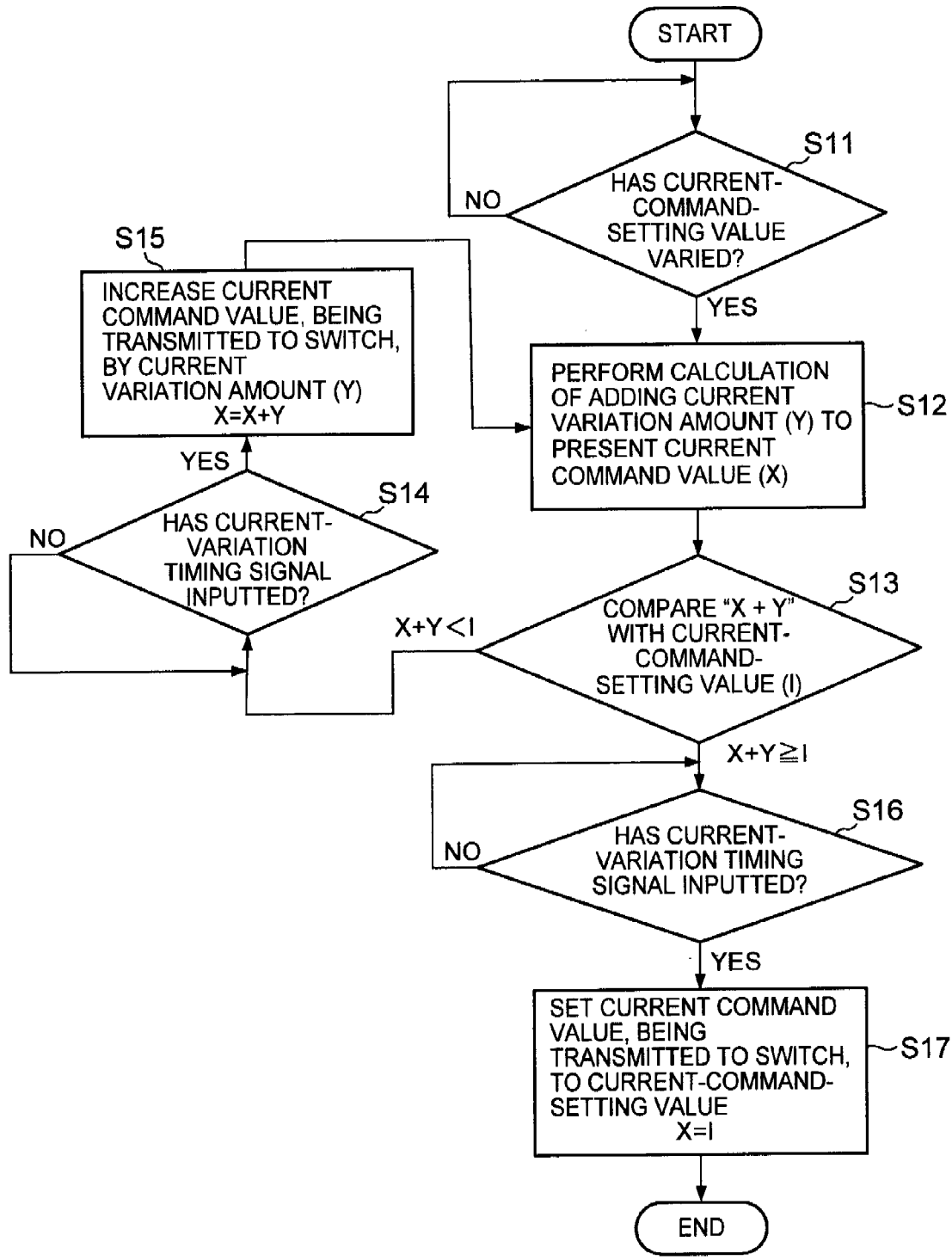
FIG. 6 is a flowchart representing an operation of the controller provided in the laser generator of Embodiment 2 according to the present invention.

FIG. 5 is a block diagram representing the internal configuration of the abnormality-determination/current-command-value-calculation unit 9, and FIG. 6 is a flowchart explaining an operation of a current command calculator 15 included in the abnormality-determination/current-command-value-calculation unit 9. Hereinafter, explanation is made based on FIG. 5 and FIG. 6.

In Embodiment 1, the current-command-setting value has been directly inputted into the switch 14; however, in this embodiment, the current-command-setting value is transmitted to the current command calculator 15 and a current-variation timing-signal generator 16. In addition to the current-command-setting value, a current variation value previously memorized in a memory 22 and a current-variation timing signal from the current-variation timing-signal generator 16 are inputted into the current command calculator 15. Here, the current variation value corresponds to an increasing step when the current command value is increased stepwise. When the current-command-setting value varies, the current-variation timing-signal generator 16, using this change as a trigger, reads thereinto a time-interval value previously memorized in a memory 23, and, after a predetermined waiting time, the current-variation timing signal is outputted, at each time interval, to the current command calculator 15. Here, the time interval corresponds to a cycle when the current command value is increased stepwise. While, the predetermined waiting time is a time set longer than a time within which processing in Step S12 and Step S13 of the following operational explanation is completed, which is used so that the current-variation timing signal does not reach the current command calculator 15 during the processing in Step S12 and Step S13 being performed in the current command calculator 15.

Next, an operation of the current command calculator 15 is explained using FIG. 6.

First, the current command calculator 15 checks whether the current-command-setting value transmitted from the current-command-setting unit 10 has varied, and if the value has varied, the following steps are executed (Step S11).

The current command calculator 15 reads thereinto a current-variation value (Y) memorized in the memory 22, and then performs calculation where the current variation value (Y) is added to a present current command value (X) (Step S12). At a time just after the operation has been started, the present current command value is 0.

Next, a value (X+Y) obtained by adding the current variation value to the present current command value and a current-command-setting value (I) are compared to each other (Step S13).

Here, in a case in which the value obtained by adding the current variation value to the present current command value is smaller than the current-command-setting value (X+Y<I), check is performed whether the current-variation timing signal is inputted from the current-variation timing-signal generator 16 (Step S14).

Then, when the current-variation timing signal is inputted, the current command value being transmitted to the switch 14 is increased by the current variation value (Step S15). After this operation, the new current command value increased by the current variation value is transmitted through the switch 14 to the electric power supply 8, and the fundamental-wave output power is increased by one step. Then, the above processing is repeated again from Step S12, and the current command value (X) is increased by the current variation value (Y) for each current-variation timing signal being inputted.

As a result of the current command value having been increased, in Step S13, in a case in which the value obtained by adding the current variation value to the current command value becomes not smaller than the current-command-setting value (X+Y≧I), check is performed whether the current-variation timing signal is inputted from the current-variation timing-signal generator 16 (Step S16).

Then, when the current-variation timing signal is inputted, the current command value being transmitted to the switch 14 is set to the same value as the current-command-setting value (Step S17). The reason why the current command value is not increased by the current variation value is because if the current command value is increased by the current variation value the current command value exceeds the current-command-setting value.

By the above operation, the stepwise increase in the current command value to the current-command-setting value has been completed.

The other operations are approximately similar to those in Embodiment 1; however, the difference is that, in Step S01 according to FIG. 3, the current command value is not set to the value transmitted from the current-command-setting unit 10, but set to that from the current command calculator 15, so that the following operations are performed.

The abnormality-determination/current-command-value-calculation unit 9 reads out the measurement value of the fundamental-wave output power. Then, this measurement value and the determination value memorized in the memory 20 are compared to each other in comparator 13. The switch 14 normally operates to transmit to the electric power supply 8 the current command value, as a first current command value, transmitted from the current command calculator 15; however, when, as the result compared by the comparator 13, the measurement value of the fundamental-wave output power is not lower than the determination value, the current command value is switched by the switch 14 to a second current command value at which the current falls to 0 A, and thus the generation of the fundamental-wave laser beam is stopped.

Figure 7:
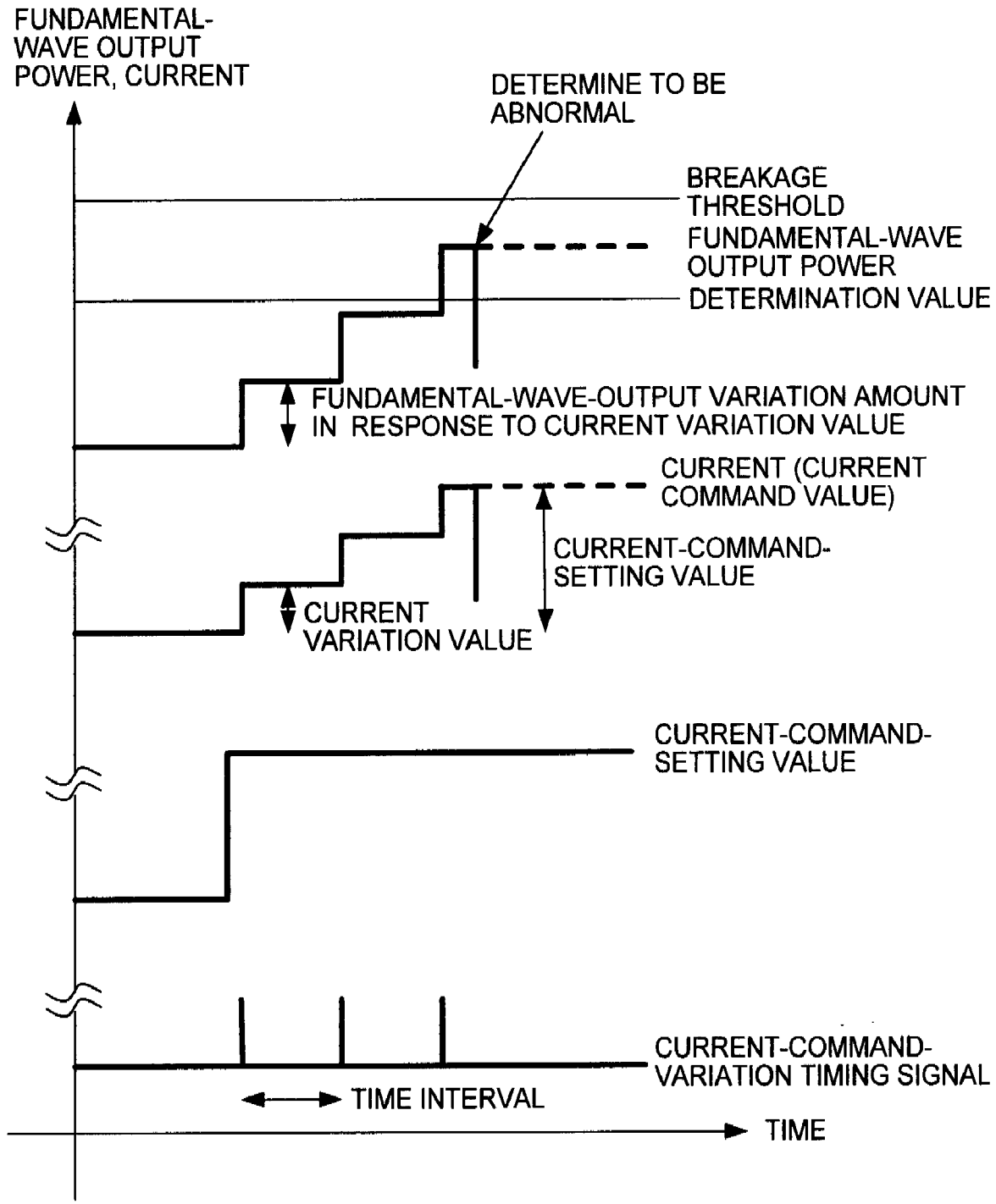
FIG. 7 is a graph representing time dependence of a current command value, and fundamental-wave output power, etc. for the laser generator of Embodiment 2 according to the present invention.

By performing the above operation in the abnormality-determination/current-command-value-calculation unit 9, the time dependence of the current supplied by the electric power supply 8 and the fundamental-wave output power in response to the current is as represented in FIG. 7. In FIG. 7, the time dependence of the current-command-setting value, the current supplied by the electric power supply 8 (that is, the current command value corresponding to the current), the fundamental-wave output power, and the current-variation timing signal, when the current-command-setting value varies once, is represented, in which the current increases by a current-variation value (Y) at predetermined time intervals with respect to the current-command-variation timing signals being outputted; thereby, the current finally reaches the current-command-setting value, and the fundamental-wave output power also increases stepwise with the variation of the current. Accordingly, the fundamental-wave output power can be prevented from exceeding the breakage threshold due to the abrupt increase of the output power as represented in FIG. 4.

Moreover, by setting as follows the current-variation value (Y), the breakage of the wavelength-conversion element can be more securely prevented.

Figure 8A:
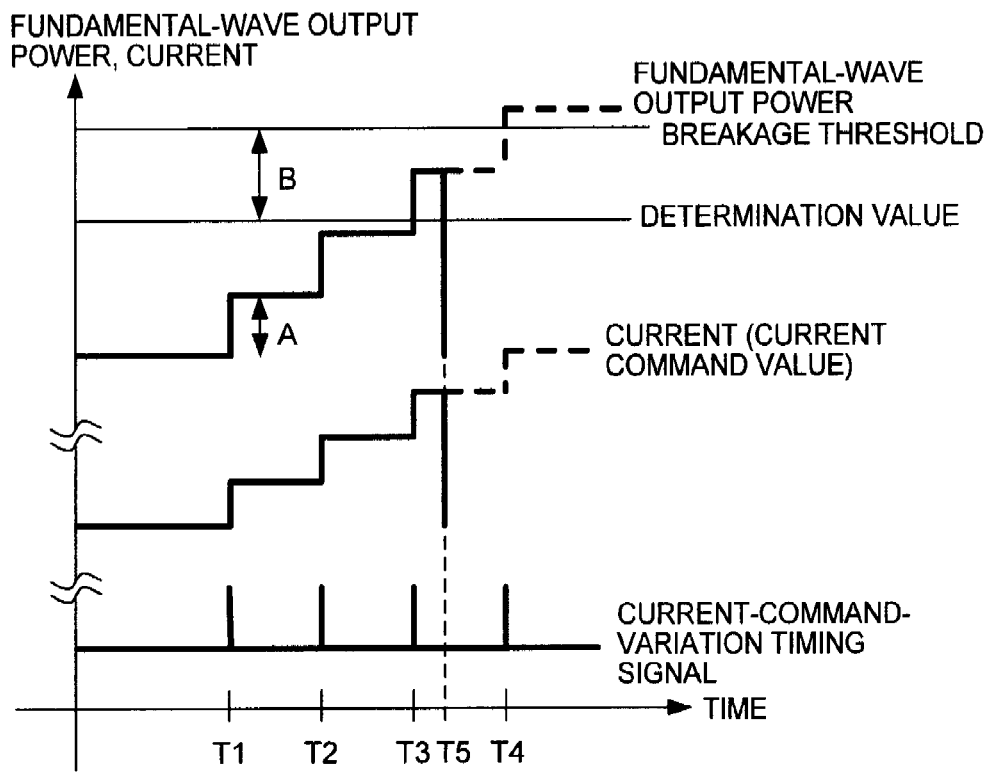
FIG. 8 includes graphs each representing time dependence of a current command value, and fundamental-wave output power, etc. for the laser generator of Embodiment 2 according to the present invention.
Figure 8B:
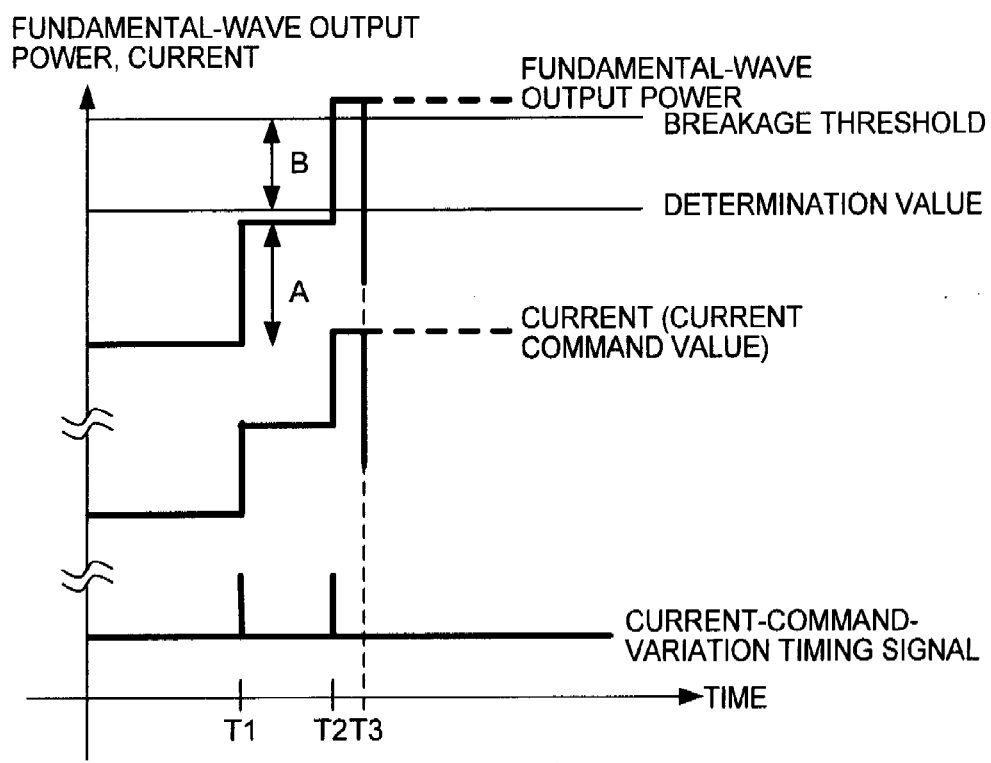

FIG. 8 represents, when the current variation value (Y) varies, the time dependence of the current supplied by the electric power supply 8, the value of the fundamental-wave output power in response to the current, and the current-variation-timing signal. A case in which a variation amount of the fundamental-wave output power (A) in response to the current-variation value (Y) is smaller than the difference between the breakage threshold and the determination value (B) (A<B) is represented in FIG. 8(a), while a case in which the variation amount of the fundamental-wave output power (A) in response to the current-variation value (Y) is larger than the difference between the breakage threshold and the determination value (B) (A>B) is represented in FIG. 8(b).

First, the case of FIG. 8(b) is explained. At a time T1 when a current-variation-timing signal is outputted, the current increases by the current-variation value (Y), and, although the fundamental-wave output power is not higher than the determination value, when the output power becomes a value close to the determination value, because the output power is not higher than the determination value, the abnormality-determination/current-command-value-calculation unit 9 determines to be normal; then, the output power increases at a time T2 when the next current-variation-timing signal is outputted. Here, the variation amount (A) of the fundamental-wave output power in response to the current-variation value (Y) is higher than the difference (B) between the breakage threshold of the wavelength-conversion element and the determination value; therefore, the output power may suddenly exceed the breakage threshold. In this case, the abnormality determination by the abnormality-determination/current-command-value-calculation unit 9 is not performed in time; consequently, even if the current command value is set to a value at which the current becomes 0 A at a time T3 after the time T2, the wavelength-conversion element might already have been broken at the time T2.

Next, the case of FIG. 8(a) is explained. At the time T2 when a current-variation-timing signal is outputted, the current increases by the current-variation value (Y), and, although the fundamental-wave output power is not higher than the determination value, when the output power becomes a value close to the determination value, because the output power is not higher than the determination value, the abnormality-determination/current-command-value-calculation unit 9 determines to be normal; then, the output power increases at the time T3 when the next current-variation-timing signal is outputted. Here, the variation amount (A) of the fundamental-wave output power in response to the current-variation amount (Y) is lower than the difference (B) between the breakage threshold of the wavelength-conversion element and the determination value; therefore, the output power exceeds the determination value, but never exceeds the breakage threshold. Therefore, at a time T5 before a time T4 when the next current-variation-timing signal is outputted, the abnormality determination is performed by the abnormality-determination/current-command-value-calculation unit 9; consequently, due to the generation of the fundamental-wave laser beam being stopped, breakage of the wavelength-conversion element is prevented.

That is, if the current variation value (Y) is set in such a way that the variation amount (A), in response to the current-variation amount (Y), of the fundamental-wave output power becomes lower than the difference (B) between the breakage threshold of the wavelength-conversion element and the determination value (A<B), the state as represented in FIG. 8(b) never occurs, in which, due to the output power exceeding the determination value, and simultaneously exceeding the breakage threshold, the wavelength-conversion element is broken; consequently, the breakage of the wavelength-conversion element can be more surely prevented.

Here, the time interval is preferably set to a time not shorter than that needed for processing the abnormality determination using the abnormality-determination/current-command-value-calculation unit 9, and stopping the generation of the fundamental-wave laser beam.

Moreover, in a case of decreasing the current, because the fundamental-wave output power does not exceed the breakage threshold of the wavelength-conversion element before the current decrease, even if the current command value is not varied stepwise, the output power never exceeds the breakage threshold of the wavelength-conversion element.

In the above explanation, when the fundamental-wave output power has exceeded the determination value, control has been performed to stop generating the fundamental-wave laser beam; however, as described in Embodiment 1, in a case in which processing using the laser generator is desired not to be stopped on the way, from the viewpoint of preventing breakage of the wavelength-conversion element, control may be performed so that, when the output power exceeds the determination value, the output power becomes a value lower than the breakage threshold. For example, the control may be performed, as described above, so that the power is returned to the output power before the current-command-setting value being inputted, or the abnormality-determination/current-command-value-calculation unit 9 may also control so as to return, by decreasing the current command value by the current-variation value memorized in the memory 22, to the state during the time from T2 to T3 represented in FIG. 8(a). Alternatively, control may also be performed in which the current command value is not varied in the state of the time T3.

According to this embodiment, in addition to the configuration in Embodiment 1, means for memorizing the predetermined time interval and the predetermined current variation amount, and for simultaneously increasing, when the current command value is increased to the current-command-setting value, the current command value by the predetermined current variation amount for at the predetermined time intervals is included; thereby, also in a case in which some time is needed for determination by the means for determining whether the output of the fundamental-wave laser beam is normal or abnormal, the fundamental-wave output power can be prevented from exceeding the breakage threshold of the wavelength-conversion element; therefore, it is more effective to prevent the breakage of the wavelength-conversion element.

Embodiment 3

Meanwhile, because the measurement delay of the sensor used for the fundamental-wave output sensor 6 is practically impossible to be reduced to zero, the measurement value takes a delayed one against the actual output value. Especially, when the thermal sensor such as the thermopile is used, because any time is needed for the thermal distribution of the sensor being stabilized, a few seconds are taken for the delay. Also, in a case of a sensor using a photodiode whose response speed is relatively high, a filter is mostly inserted thereinto for eliminating noises; therefore, delay of several ten ms through several hundred ms may occur.

FIG. 9 includes graphs in which the time dependence of the current-variation-timing signal, the current supplied by the electric power supply 8 (or the current command value corresponding to the current), the actual fundamental-wave output power in response to the current, the measurement value of the output power, and the current-variation-timing signal is represented.

Figure 9A:
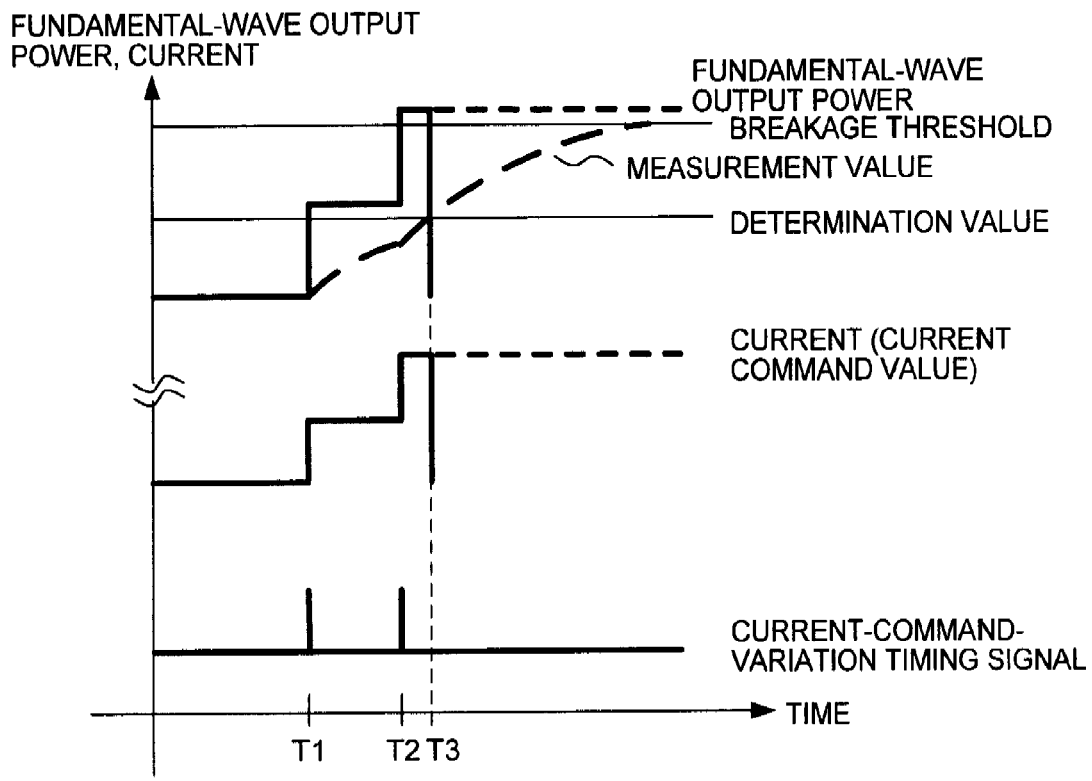
FIG. 9 includes graphs each representing time dependence of a current command value, and fundamental-wave output power, etc. for a laser generator of Embodiment 3 according to the present invention.

In FIG. 9(a), the current (current command value) increases at the time T1 when a current-variation-timing signal is outputted, and the fundamental-wave output power exceeds the determination value. However, because the measurement value of the fundamental-wave output power includes time delay, the value becomes, just after the fundamental-wave output power has varied, lower than that of the actual output power, which is a value not higher than the determination value. Accordingly, the abnormality-determination/current-command-value-calculation unit 9 determines that the fundamental-wave output power is normal, and continues the processing. In a case in which the next current-variation-timing signal is outputted before the measurement value reaches the determination value, the current value (current command value) increases at the time T2. Here, as described in Embodiment 2, even if the variation amount of the fundamental-wave output power based on that of the current value (current command value) is less than the difference between the breakage threshold and the determination value, because the fundamental-wave output power exceeds the determination value at the time T1, the power may exceed the breakage threshold at the time T2. As represented in FIG. 9(a), even though the fundamental-wave output power exceeds the breakage threshold at the time T2, then the measurement value becomes the determination value at the time T3, and thereby the abnormality-determination/current-command-value-calculation unit 9 determines that the output power is abnormal, the wavelength-conversion element might have been broken; consequently, an undesirable result may be obtained.

In Embodiment 3, considering the above point, the method of setting the current command value by the abnormality-determination/current-command-value-calculation unit 9 is changed. Especially, the value of the time interval memorized in the memory 23 is different. The overall configuration of the laser generator according to this embodiment is similar to that in FIG. 1, and the configuration of the abnormality-determination/current-command-value-calculation unit 9 is similar to that in FIG. 5; therefore, explanation is made suitably using the reference numerals in FIG. 1 and FIG. 2.

Hereinafter, an operation is briefly explained.

Figure 9B:
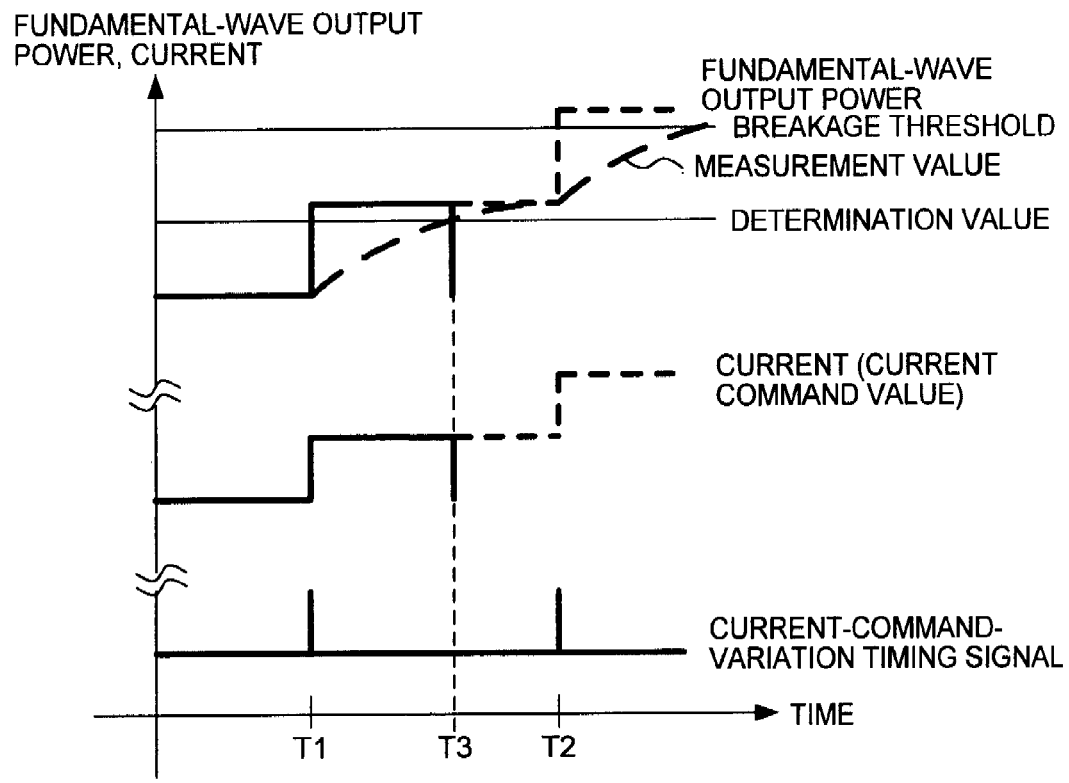

The current-command-setting value set by the current-command-setting unit 10 is transmitted to the abnormality-determination/current-command-value-calculation unit 9. In the abnormality-determination/current-command-value-calculation unit 9, the current command value is increased to the current-command-setting value stepwise by the current variation value previously memorized in the memory 22 at the time intervals previously memorized in the memory 23. At this time, as represented in FIG. 9(b), the current-variation timing signal is outputted at the time T1, and the current command value is varied only by the current variation value; then, a waiting time is provided, and after the measurement value measured by the fundamental-wave output sensor 6 becomes the actual value of the fundamental-wave output power, the current-variation-timing signal is outputted at the time T2. In a case of the properties represented in FIG. 9(b), the fundamental-wave output power exceeds the determination value at the time T1; while, the measurement value does not exceed the determination value at the time T1. However, by securing an enough time during the times T1 and T2, that is, the time interval, before the next current-variation-timing signal is outputted, the measurement value reaches the determination value at the time T3. Accordingly, the abnormality-determination/current-command-value-calculation unit 9 can determine that the fundamental-wave output power is abnormal; thereby, generation of the fundamental-wave laser beam can be stopped before the fundamental-wave output power exceeds the breakage threshold at the time T2.

As described above, by setting the time interval to a value not shorter than the measurement delay by the fundamental-wave output sensor, the current command value is made not to be changed when the measurement value of the fundamental-wave output power is lower than the actual value of the power. Therefore, if the current variation value is also set as that in Embodiment 2, even though the current command value varies by one step, the actual fundamental-wave output power is made not to reach the breakage threshold of the wavelength-conversion element. Moreover, in a case in which the actual fundamental-wave output power exceeds the determination value, if the waiting time with respect to the current command value is set as the above explanation, at the time T3 when the measurement value of the fundamental-wave output power exceeds the determination value, the power is stopped; therefore, breakage of the wavelength-conversion element can be prevented.

When the current is decreased, similarly to the case in Embodiment 2, the current command value is needless to be stepwise varied.

In the above explanation, when the fundamental-wave output power exceeds the determination value, the control has been performed so that the generation of the fundamental-wave laser beam is stopped; however, as described in Embodiment 2, when the output power exceeds the determination value, the output power may be controlled so as to be a value lower than the breakage threshold.

According to this embodiment, the state represented in Embodiment 2 can be prevented in which, although, by setting the current-variation time interval to a value not shorter than the measurement delay by the fundamental-wave output sensor, the actual fundamental-wave output power exceeds the determination value, the output power is determined to be normal, and the wavelength-conversion element is resultantly broken; therefore, it is more effective to prevent the breakage of the wavelength-conversion element.

Here, if the laser output power is frequently varied, a fundamental-wave output sensor such as a thermo pile whose response time is relatively long, such as several seconds, cannot be applicably used. At a time when the laser generator is started up, the fundamental-wave output power is significantly varied; therefore, breakage of the wavelength-conversion element is most likely to occur at this time. Moreover, because, when the generator is started up, a waiting time is needed before optical parts thereof become the thermal equilibrium state, even if several seconds are needed for the response time of the sensor, problems may not especially occur. Accordingly, in a case in which the laser output power is varied a little when laser processing is performed, even if an output sensor whose response time is relatively long is used, an effect can be obtained in which breakage of the wavelength-conversion element is prevented when the operation of the laser generator is started up.

INDUSTRIAL APPLICABILITY

The laser generator according to the present invention is suitably used in a case in which a higher-harmonic-wave laser beam including visible light or ultraviolet light generated by a wavelength-conversion element is used for processing.

What is claimed is:

1. A laser generator comprising:
a generation means for pumping by a pumping light source a pumping medium to generate a fundamental-wave laser beam;
an electric power supply for supplying current for exciting the pumping light source;
an output sensor for measuring average output power or pulse energy of the fundamental-wave laser beam;
a wavelength-conversion element, arranged on an optical path for the fundamental-wave laser beam, for converting the fundamental-wave laser beam into its higher-harmonic-wave laser beam;

a current-command-setting means for setting and outputting a current-command-setting value as a current-command value for obtaining a desired laser-beam intensity;

a memory unit for memorizing a determination value set to a value lower than a breakage threshold for average output power or pulse energy of the laser beam converted by the wavelength-conversion element;

a current-command-calculation means for, when the current-command-setting value outputted by the current-command-setting means varies, outputting the current-command value while increasing the current-command value to the current-command-setting value by a predetermined variation amount, which is lower than a difference between the breakage threshold of the wavelength-conversion element and the determination value, at predetermined time intervals;

a comparing means for comparing a measurement value measured by the output sensor and the determination value; and a switching means for switching;

(a) when the measurement value is determined by the comparing means to be a value lower than the determination value, a current-command value transmitted to the electric power supply, to a first current-command value transmitted from the current-command-calculation means, (b) while when the measurement value is determined by the comparing means to be a value not lower than the determination value, the current-command value to a second current-command value by which the output power of the fundamental-wave laser beam becomes lower than the breakage threshold.

2. A laser generator as recited in claim 1, wherein the predetermined time intervals each are not shorter than a measurement delay by the output sensor.

3. A laser generator as recited in claim 1 or 2, wherein the second current-command value is a current-command value before the current-command-setting value is changed.

* * * * *